US007337515B2

(12) United States Patent
Phillips et al.

(10) Patent No.: US 7,337,515 B2
(45) Date of Patent: Mar. 4, 2008

(54) HYBRID BREACHING BAR

(75) Inventors: Darron Phillips, San Antonio, TX (US); Jeff Wright, Buluerde, TX (US); Craig Staff, Victoria, TX (US)

(73) Assignee: Breaching Technologies, Inc., San Antonio, TX (US)

( * ) Notice: Subject to any disclaimer, the term of this patent is extended or adjusted under 35 U.S.C. 154(b) by 67 days.

(21) Appl. No.: 11/339,329

(22) Filed: Jan. 25, 2006

(65) Prior Publication Data

US 2007/0169329 A1 Jul. 26, 2007

(51) Int. Cl.
*B23P 19/04* (2006.01)

(52) U.S. Cl. ............................... 29/254; 29/270; 269/3

(58) Field of Classification Search .................. 29/254, 29/278, 270; 269/3, 6; 254/93 H, 21
See application file for complete search history.

(56) References Cited

U.S. PATENT DOCUMENTS

| | | | | | |
|---|---|---|---|---|---|
| 4,660,806 | A | * | 4/1987 | Masters | 254/11 |
| 4,783,053 | A | * | 11/1988 | Yirmiyahu et al. | 254/93 R |
| 5,810,333 | A | * | 9/1998 | Hickerson et al. | 254/93 R |
| 6,711,791 | B2 | * | 3/2004 | Hess | 29/426.5 |
| 6,746,183 | B1 | * | 6/2004 | Sullivan | 405/272 |
| 6,916,013 | B2 | * | 7/2005 | Cardona | 254/93 R |

* cited by examiner

*Primary Examiner*—Lee D Wilson
(74) *Attorney, Agent, or Firm*—Gunn & Lee, P.C.

(57) ABSTRACT

An device for breaching an outwardly opening door and methods for use thereof. The device combines a serrated blade for penetrating the crevice between a door and a doorjamb and an extendable handle with a ratcheting mechanism allowing the operator to remain out of the line of fire when breaching the door. The device may also be used by a single operator by initially driving the blade between the door and doorjamb via a hammering function involving the retraction of the extendable handle combined with the weighted block and thrusting force applied thereto.

8 Claims, 6 Drawing Sheets

HYBRID BREACHING BAR

BACKGROUND OF THE INVENTION

1. Field of the Invention

The present invention is directed toward an apparatus for safe, effective forced entry of a house or building. In particular, the present invention is directed toward a device for safely, quickly and efficiently prying an outwardly opening door.

2. Background Information

In today's society, it is becoming increasingly vital for emergency personnel to gain entry into a locked house or building. For instance, a fire fighter or rescue worker must enter a burning or otherwise dangerous, locked structure in order to save the lives of the citizens trapped inside. On the other end of the spectrum law enforcement or military personnel must tactically gain forced entry into a structure in order to capture and subdue individuals in the process of carrying out their respective duties. The foregoing situations and the endless variants lying in between each have a common goal: quick, safe, and effective forced entry of a locked structure.

In response, numerous methods and tools for gaining forced entry into a locked structure have been developed. Such methods and tools range from large, heavy rams used to break down doors to shotgun blasts or explosive devices used to disable the door's locking device. However, probably the most widely used tool for gaining such forced entry is the Halligan or breaching bar, favored for the speed with which it can be used for prying an outwardly opening door.

The Halligan or breaching bar is a multipurpose prying tool consisting of a claw, a blade, an extended handle, and a pick. The pick end of the tool is useful for breaking through many types of locked doors. At the other end of the tool, the claw/blade is used to break in through an outwardly swinging door by forcing the tool between the door and doorjamb and prying the two apart by pulling on the length of handle separating the pick end from the claw/blade end. Typically, the use of such a breaching bar requires at least two persons. One person is required to operate the breaching bar and the other to operate a sledge hammer. The breaching bar operator inserts the smooth blade between the door and the doorjamb while holding the handle end of the bar. The hammer operator then strikes the backside of the blade end of the tool with the hammer in order to penetrate the opening. Finally, the breaching bar operator leverages the tool by pulling on the breaching bar, forcing the door open outwardly. Consequently, it is not until the door is completely forced open that the breaching bar operator's position is clear from the front of the door opening.

Although the typical breaching bar that is commonly used by law enforcement and military personnel works well in its present form and variants thereof, its use places the operator in a most dangerous position. For instance, in tactical scenarios, the individuals opening the door may be subject to gunfire through the door at the time of entry. Consequently, this area in front of the door has been dubbed the "fatal funnel". As will be discussed in greater detail, the design of the Halligan bar necessitates that its operator stand in front of the door from the time that the breaching bar is positioned for insertion between the door and the doorjamb to the time the door is pried open. Thus, the breaching bar operator is positioned in the "fatal funnel" for an extended period during a forced tactical entry.

Additionally, whether members of the tactical team are in the "fatal funnel" or not, their lives are at risk. This is especially true for the breaching bar operator because he/she is not weapon ready when performing the breach. However, it is also true for the hammer operator for the same reason; thus, two team members are momentarily defenseless against attack rather than merely one.

Finally, during a tactical breach, not only are the lives of the entry team at risk, but the lives of countless hostages or other innocent bystanders may also be at risk. This situation demands that speed and surprise be the key ingredients to a successful tactical entry. Unfortunately, entry teams have found that currently available breaching bars have an additional shortcoming that can lead to disastrous effects for all involved. All to often, the smooth blade slips out of the space between the door and the doorjamb during the prying process forcing the team into an additional attempt. Consequently, precious time is wasted, which leads to needless loss of life.

In view of the limitations of products currently known in the art, a tremendous need exists for a breaching bar that allows an single operator to safely and efficiently gain forced entry through an outwardly opening door. Applicant's invention, by its novel design provides a solution in view of currently available devices.

SUMMARY OF THE INVENTION

In view of the foregoing, it is an object of the present invention to provide a device for forced entry of an outwardly opening door that allows operator positioning outside of the area known as the "fatal funnel".

It is another object of the present invention to provide a device for forced entry of an outwardly opening door that is operable by a single operator.

It is another object of the present invention to provide a device for forced entry of an outwardly opening door that increases the speed and effectiveness of the breaching operation.

It is another object of the present invention to provide a device for forced entry of an outwardly opening door that is reliable.

In satisfaction of these and other related objectives, the present invention provides a device for safe, efficient, effective, and reliable forced entry of an outwardly opening door. As will be discussed in the specification to follow, the device of the present invention embodies a combination of components so configured to allow a single operator to efficiently breach an outwardly opening door while remaining outside of the area known as the "fatal funnel".

The preferred embodiment of the present invention incorporates a serrated blade attached to a primary effecter head. This primary effecter head, in turn, is so attached to an extendable handle as to allow ratcheting of the handle with respect to the primary effecter head. Additionally, the extendable handle is configured to quickly, slidably extend or retract. Finally attached to the opposite end of the extendable handle is a weighted secondary effecter head configured for attachment of a secondary tool.

First, the make-up and configuration of the component parts of the present invention allow operation of the device to breach an outwardly opening door while allowing its operator to remain outside of the area known as the "fatal funnel". The traditional breaching bar has a blade oriented in a fixed position perpendicularly to an extended handle. As previously described, the operator must stand within the "fatal funnel" to align the blade in between the door and the door jam, and the operator must remain in this vulnerable position while a hammer operator drives the blade into position. Only at this point can the breaching bar operator complete the breach by pulling on the handle and prying the door open. By contrast, the device of the present invention, in the two-man embodiment allows the hybrid breaching bar operator and the hammer operator to stand on the same side of the door outside of the "fatal funnel". Once the blade is hammered in place, the hybrid breaching bar operator merely ratchets the handle forward and pulls back on the extended handle, thereby prying the door open, all while remaining clear of the "fatal funnel". Thus, the device of the present invention allows much safer operation of the hybrid breaching bar than that allowed by the traditional breaching bar.

Additionally, the device of the present invention ensures efficient breaching of an outwardly opening door through the novel and unobvious incorporation of a serrated blade at the primary effecter end of the hybrid breaching bar. The traditional breaching bar components encompass a smooth blade; correspondingly, the blade is prone to "slipping out" of the crevice between the door and door jam during breaching leaving the entry team in the treacherous position of having to re-attempt the breach. Contrastingly, the preferred embodiment of the present invention involves the use of a serrated or toothed blade. As such, the serrations or teeth of the blade of the present invention embed into the door during the prying operation allowing the operator to pry the door open the "first time, every time". Therefore, the device of the present invention operates more reliably and efficiently than that of the traditional breaching bar.

Finally, the make-up and configuration of the component parts of the preferred embodiment of the present invention allow efficient operation of the device by a single user. As previously noted, the traditional breaching bar requires two individuals to properly operate the device because driving the blade of the traditional breaching bar in between a door and a doorjamb requires the impact force of a hammer operated by a second individual. The device of the present invention solves this dilemma in a novel and unobvious fashion by combining a slideably, extendable handle with a weighted secondary effecter head attached to the handle opposite the end with the primary effecter head. This attribute in combination with the ability to ratchet the handle to a position wherein it is "in line" with the blade allows a single operator to: (1) place the blade against the crevice between the door and the door jam; (2) extend the handle and quickly retract the handle from the weighted secondary head thereby imparting significant impact force to the primary effecter head driving it into place; and (3) pull or push on the handle to pry the door open. Thus, the device of the present invention, in contrast to the traditional breaching bar, allows efficient operation by a single user.

In summary, an embodiment of the present invention provides for safe, efficient, effective, and reliable forced entry of an outwardly opening door.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
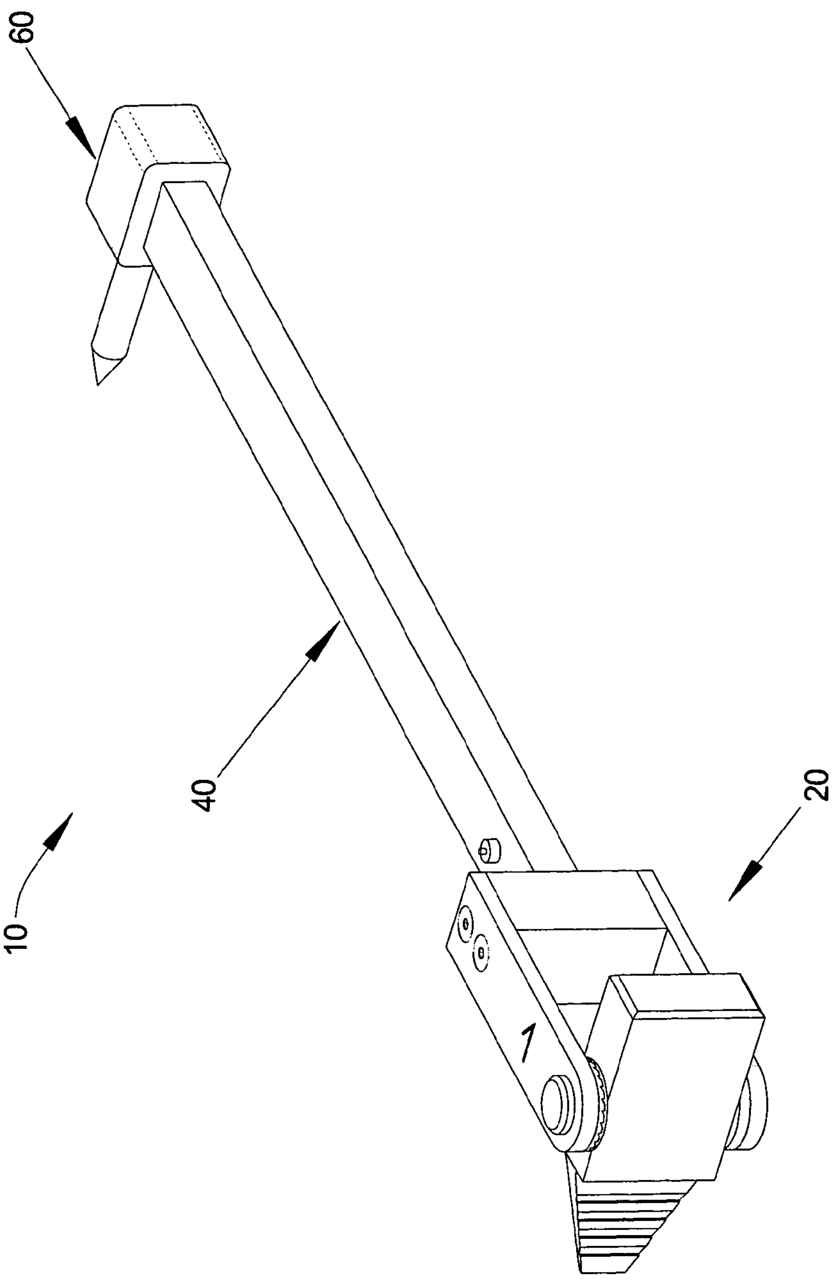
FIG. 1 is a perspective view of the apparatus of the present invention.
Figure 2:
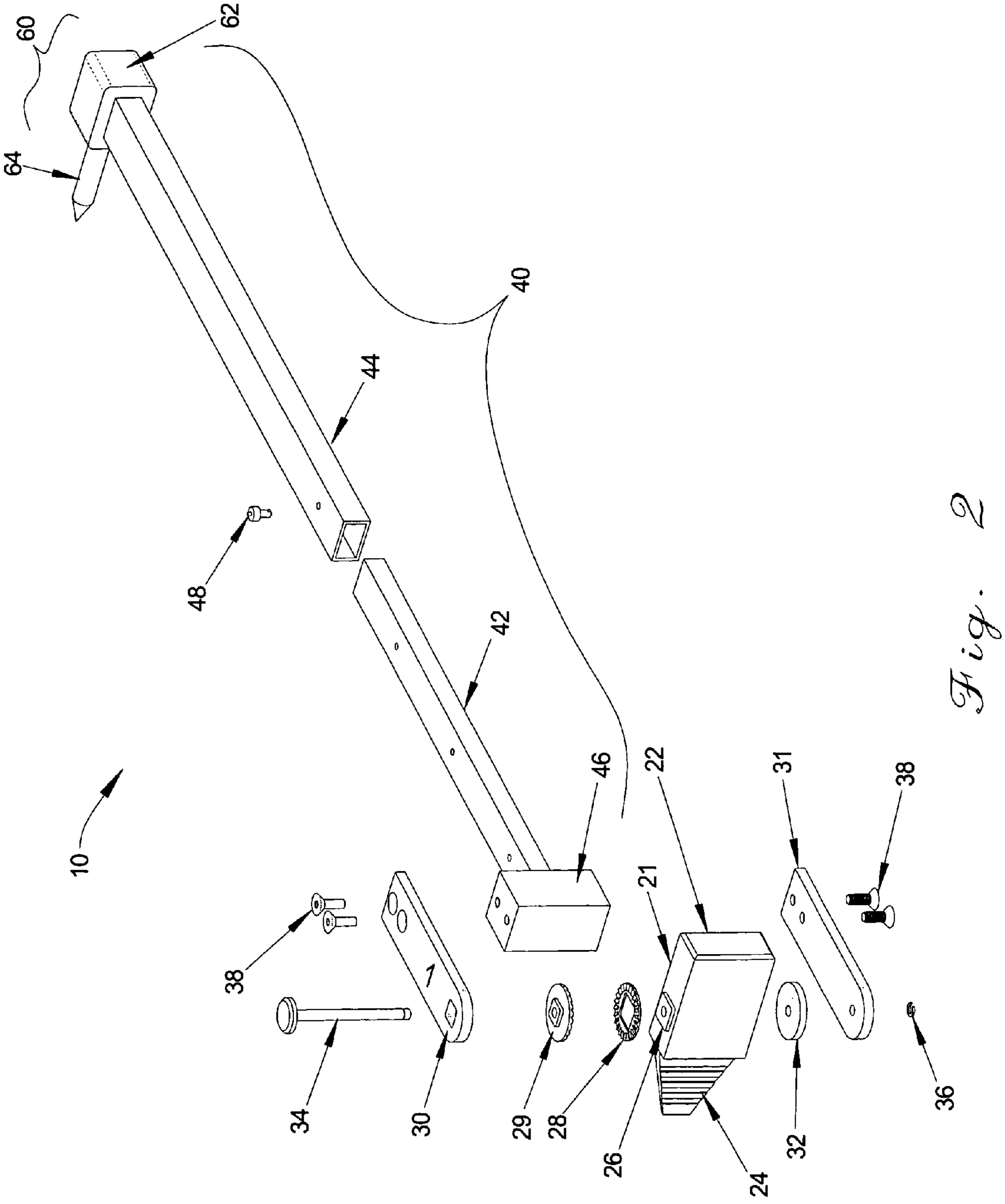
FIG. 2 is an exploded perspective view of the apparatus of the present invention.

Referring to FIGS. 1 and 2, a device for breaching an outwardly opening door is shown and is generally designated by numeral 10. As best seen in FIG. 1, the device of the present invention is comprised of three major components: ratcheting head (20), extendable handle (40), and secondary head (60).

As best seen in FIG. 2, ratcheting head (20) is comprised of various components such that a ratcheting action is enabled. In the preferred embodiment, ratcheting head (20) is made up of spring (32), primary effecter head (21), sprag face plate (28), and sprag face plate (29) sandwiched between upper yoke arm (30) and lower yoke arm (31) as shown. The assembly comprising ratcheting head (20) is bound together by pin (34) and snap ring (36).

In the preferred embodiment, primary effecter head (21) is comprised of primary block (22), blade (24), and square boss (26). In operation, primary effecter head (21) is the high-strength component driven between items to be separated; thus, both block (22) and blade (24) must be impact resistant, abrasion resistant, and as strong and light as possible. Hence, in the preferred embodiment of the present invention, a high strength steel, such as ASTM 4130 heat treated to a minimum yield strength of 100,000 psi and a minimum hardness of Rc 50, is used to form block (22) and blade (24), although other suitably high-strength, high-impact materials may be used as well.

Additionally, as best seen in FIG. 2, serrations or teeth are provided on each side of blade (24). As previously detailed, the serrations or teeth embed into the door during the prying operation prevent the blade from being ejected prior to completing the breach.

Still referring to FIG. 2, the combination of first sprag face plate (28) and second sprag face plate (29) provide the unidirectional application of force, or ratcheting action, of device (10) of the present invention. This ratcheting ability is accomplished by first sprag face plate (28) and second sprag face plate (29) having identical but opposite teeth on their respective surfaces, which engage one another to prevent rotation of plate (28) with respect to plate (29) when device (10) is rotated in one direction; however, the teeth slide past one another allowing free rotation of plate (28) with respect to plate (29) when device (10) is rotated in the opposite direction.

Although any number of teeth may be formed into sprag face plates (28,29), the preferred embodiment of the present invention contemplates 24 teeth, which provides a locked position every 15 degrees of rotation. This feature of locking primary effecter head (20) in 24 discrete positions allows the operator to apply the tool in 24 discrete orientations. Additionally, primary effecter head (20) may rotate to a position that provides for minimal overall length of the tool for optimum stowing of device (10).

Still referring to FIG. 2, sprag plate (28) is constrained to move with primary effecter head (20) via square boss (26).

Square boss (26), being either formed from or fixedly attached to block (22), engages sprag plate (28) by virtue of a square hole cut through the center of sprag plate (28). Similarly, sprag plate (29) is constrained to move with upper yoke arm (30) via a square boss extended from sprag plate (29) opposite the tooth side, which engages a square hole cut through upper yoke arm (30).

In order for sprag plate (28) to rotate with respect to sprag plate (29) in the non-locking direction, plate (28) must move axially relative to plate (29) in order for their respective teeth to cycle between engaged and disengaged orientations. Referring to FIG. 2, spring (32) allows for such axial movement. In the preferred embodiment, initial compression of spring (32) is set to allow such axial movement during the ratcheting operation, yet return sprag plate (28) to the engaged position with respect to sprag plate (29) when ratcheting is complete.

In the preferred embodiment, spring (32) is a washer made of urethane rubber or other suitable material. Although other suitable axial springs are contemplated within the present invention, such as traditional helical or Belleville type springs, a solid type spring is preferred in order to eliminate contamination that might limit the axial compression necessary for proper functioning of device (10).

Referring back to FIG. 2, handle (40) is composed of inner tube (42) and outer tube (44). Additionally, handle boss (46) is fixedly attached to inner tube (42) at the proximal end of inner tube (42) whereat ratchet assembly (20) is attached via screws (38) or other suitable attachment means as known in the art. At its distal end, inner tube (42) is configured to reversibly engage outer tube (44) by sliding through the center of outer tube (44) at outer tube (44) proximal end. Hence, the length of handle (40) may be extended for maximum mechanical advantage by sliding inner tube (42) away from outer tube (44) and pinning the tubes respective to one another via locking pin (48). Similarly, handle (40) may be retracted to a minimal length for easy stowing of device (10).

Finally, outer tube (44) of handle (40) attaches to secondary head (60) at outer tube (44) distal end. Secondary head (60), in turn, is comprised of weighted block (62) and optional ancillary tool (64). Tool (64) may be a spike as shown in FIG. 2, or it may be one of a number of common end effecter tools. Weighted block (62), on the other hand, primarily provides energy during the slide hammer operation.

Figure 3:
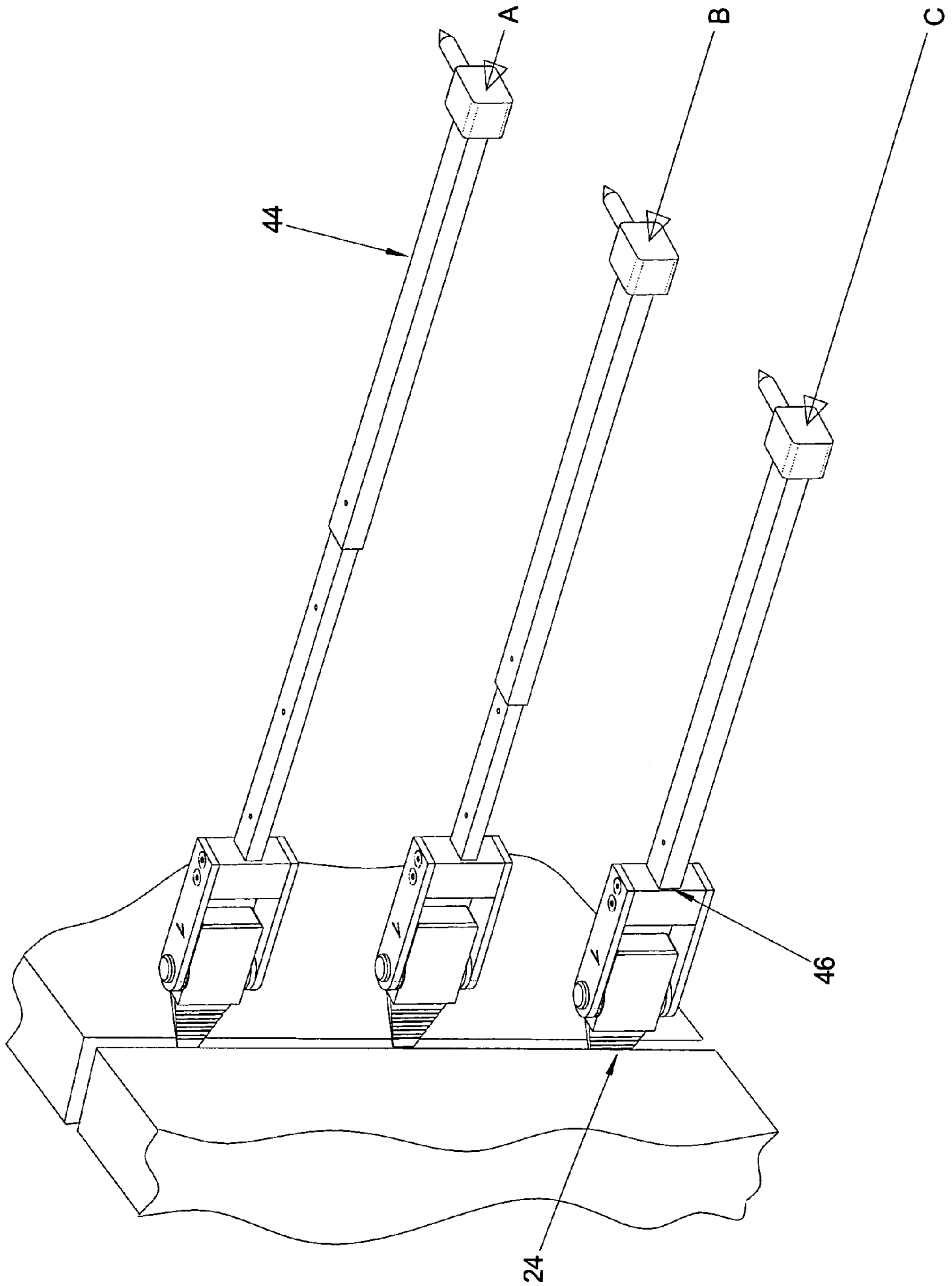
FIG. 3 is a perspective view of the hammer mechanism of the apparatus of the present invention in operation.

As shown in FIG. 3, a single operator can hammer blade (24) into the objective point by virtue of the sliding handle (40) and weighted block (62). In operation, an operator aligns ratchet head (20) axially with handle (40) and places blade (24) at the crevice between a door and a doorjamb as shown in FIG. 3. Next, the operator draws back outer tube (44) to handle (40) fully extended position as shown in configuration A in FIG. 3. The operator then thrusts weighted block (62) via outer tube (44) into handle boss (46); thus, blade (24) is inserted between the door and door jam by a single user without the need for an additional entry member to wield a hammer.

Figure 4:
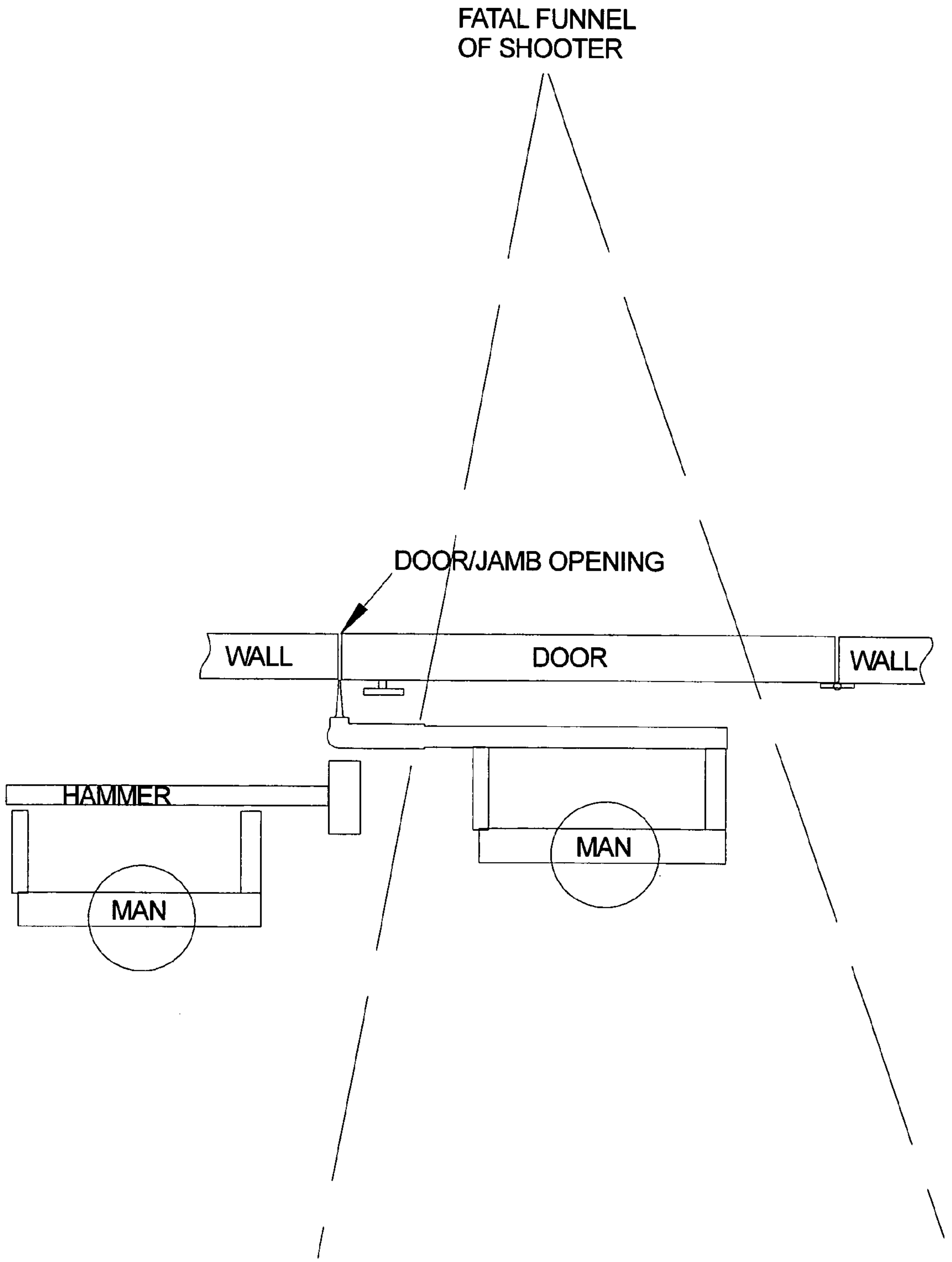
FIG. 4 is a top plan view of the method of use of a standard breaching bar of the prior art.
Figure 5:
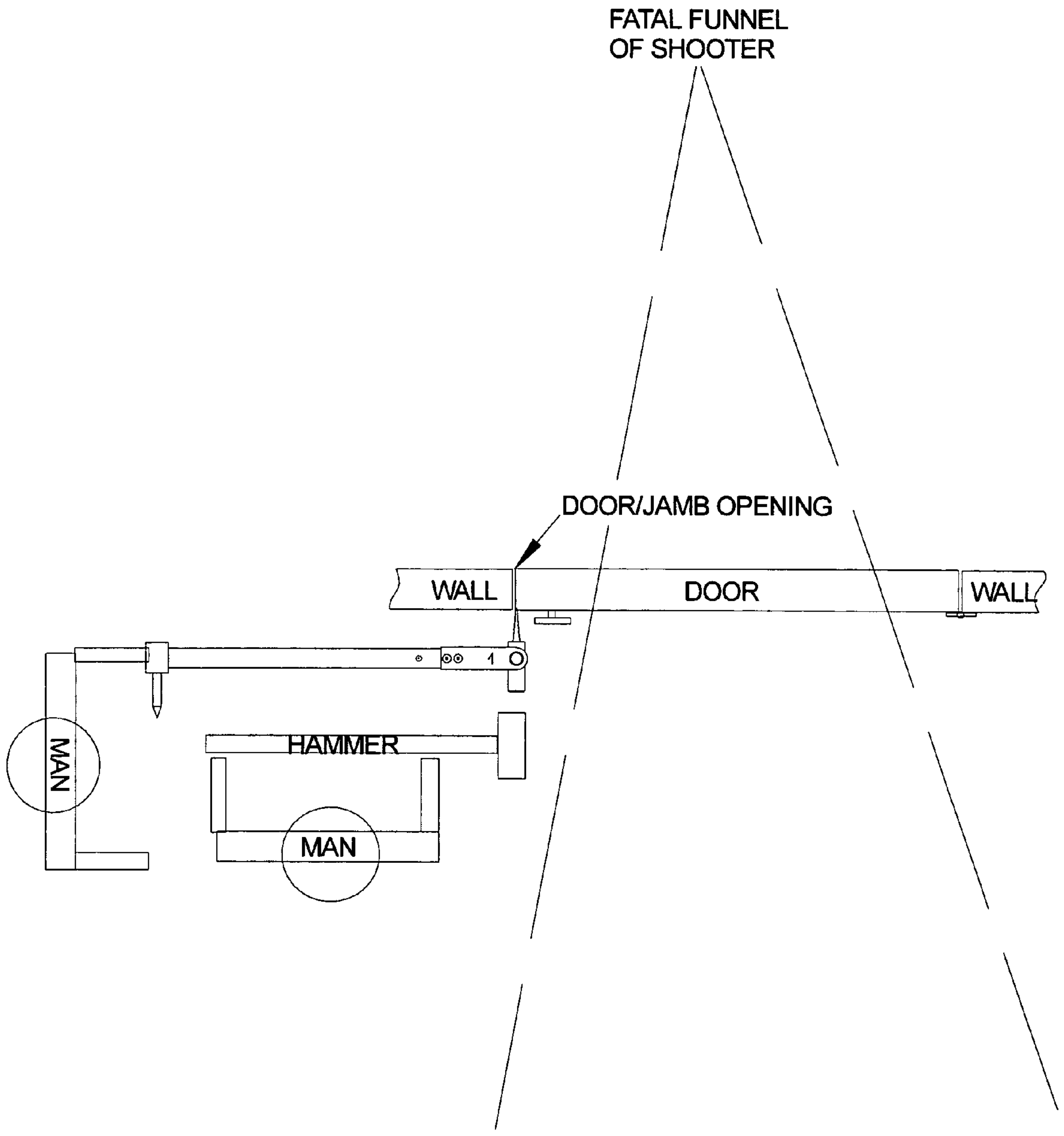
FIG. 5 is a top plan view of the two-person method of use of the apparatus of the present invention.
Figure 6:
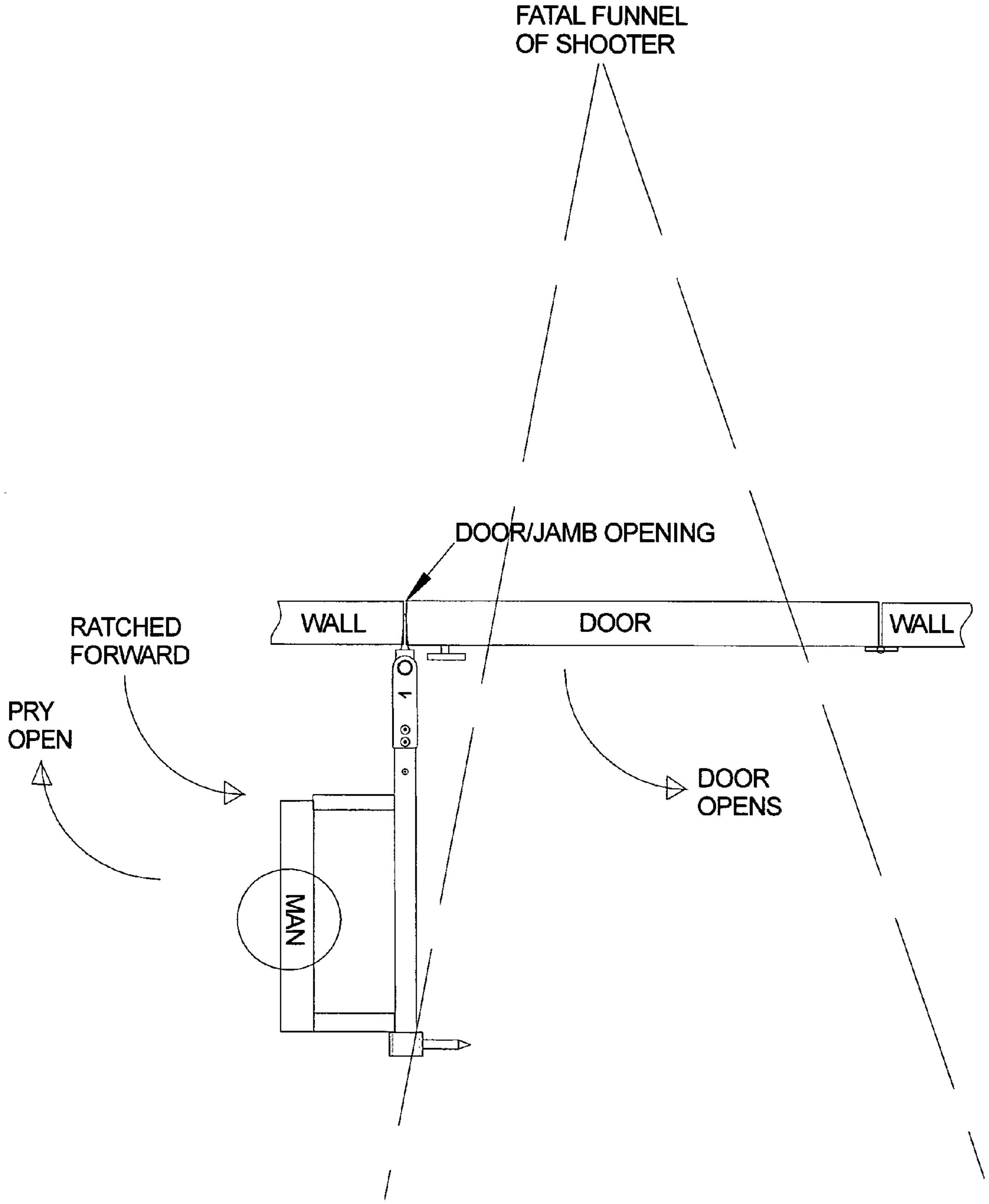
FIG. 6 is a top plan view of the apparatus of the present invention in operation.

However, although device (10) of the present invention may be operated by a single user as formerly described, device (10) may also be used in a more traditional two-person manner without exposing either team member to the area known as the "fatal funnel". As shown in FIG. 4, during tactical operations using a traditional breaching bar, one operator positions the breaching bar, while another drives the blade between the door and doorjamb using either a ram or hammer. Clearly this scenario positions the breaching bar operator directly in the middle of the "fatal funnel". However, by rotating ratchet head (20) of device (10) of the present invention as shown in FIG. 5, both the operator of the hybrid breaching bar and the hammer operator maintain positions outside of the "fatal funnel". Finally, once device (10) of the present invention is set, the hybrid breaching bar operator can then ratchet device (10) to gain the required leverage and pry open the door as shown in FIG. 6.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

We claim:

1. An apparatus for forced entry of an outwardly opening door, comprising:

a primary end member, said primary end member having a block member fixedly attached to a blade member;

a handle member having a proximal and distal end, said handle member being attached to said primary end member via a ratcheting mechanism at said handle member proximal end, said handle member and said ratcheting mechanism being configured such that application of force near said handle member distal end substantially perpendicular to said handle member results in unidirectional application of force to said blade member; and a secondary end member, said secondary end member having a weighted block member and an auxiliary tool attachment means.

2. The apparatus of claim 1 wherein said blade member has a serrated or toothed surface.

3. The apparatus of claim 2 wherein said handle member is slidably extendable.

4. A method for forced entry of an outwardly opening door comprising the steps of:

selecting an apparatus for forced entry of an outwardly opening door comprising:

a primary end member, said primary end member having a block member fixedly attached to a blade member;

a handle member having a proximal and distal end, said handle member being attached to said primary end member via a ratcheting mechanism at said handle member proximal end, said handle member and said ratcheting mechanism being configured such that application of force near said handle member distal end substantially perpendicular to said handle member results in unidirectional application of force to said blade member; and a secondary end member, said secondary end member having a weighted block member and an auxiliary tool attachment means;

aligning said blade member between a door and a doorjamb with said handle member substantially perpendicular to said blade member;

driving said blade member between said door and said door jamb by striking a block member;

ratcheting said handle member to a position where the axis of said handle member is substantially in line with said blade member; and exerting force substantially perpendicular to said handle member near said handle member distal end until said door opens outwardly.

5. The method of claim 4 wherein said blade member has a serrated or toothed surface.

6. The method of claim 5 wherein said handle member is slidably extendable.

7. A method for forced entry of an outwardly opening door comprising the steps of:

selecting an apparatus for forced entry of an outwardly opening door comprising:

a primary end member, said primary end member having a block member fixedly attached to a blade member;

handle member having a proximal and distal end, said handle member being attached to said primary end member via a ratcheting mechanism at said handle member proximal end, said handle member and said ratcheting mechanism being configured such that application of force near said handle member distal end substantially perpendicular to said handle member results in unidirectional application of force to said blade member; and a secondary end member, said secondary end member having a weighted block member and an auxiliary tool attachment means;

aligning said blade member between a door and a doorjamb wherein said handle member axis is substantially in line with said blade member;

fully extending said handle member;

applying thrusting force to the combination of said weighted block and said handle member such that said handle member is retracted resulting in an impact force upon said blade member driving said blade member between said door and said doorjamb; and exerting force substantially perpendicular to said handle member near said handle member distal end until said door opens outwardly.

8. The method of claim 7 wherein said blade member has a serrated or toothed surface.

* * * * *